May 10, 1938. B. E. WILLIAMS ET AL 2,117,125
TREATMENT OF LAMB CARCASSES
Filed June 26, 1937  2 Sheets-Sheet 1

Beverly E. Williams
and Leon L. Cadwell
INVENTOR

Witness -
H. E. Sahlin

BY [signature]
ATTORNEY

Patented May 10, 1938

2,117,125

UNITED STATES PATENT OFFICE

2,117,125

TREATMENT OF LAMB CARCASSES

Beverly E. Williams and Leon L. Cadwell, Chicago, Ill., assignors to Swift and Company, Chicago, Ill., a corporation of Illinois Application June 26, 1937, Serial No. 150,601

3 Claims. (Cl. 99—157)

This invention relates to the treatment of the carcasses of sheep and lambs.

One of the objects of the invention is to provide an improved method of dressing sheep or lamb carcasses.

Another object of the invention is to provide a method of packaging lamb or mutton.

Another object of the invention is to provide a method for the treatment of lamb or mutton to prevent deterioration and to improve the flavor of the cooked meat.

Other objects of the invention will be apparent from the description and claims which follow.

For the purposes of the present specification and of the claims which follow, the term "lamb" will be understood in its usual trade meaning as including all sheep carcasses and wholesale portions thereof irrespective of the age or sex of the animal.

In preparing lambs for market in an abattoir or packing house, it is the usual practice to remove the pelt on or adjacent the killing floor, the skinned, dressed entire carcasses being then placed in a cooler, that is, a refrigerated room held at refrigerating temperatures ordinarily about 34° Fahrenheit. The animal heat is removed in the cooler with an appreciable loss in weight by reason of evaporation of moisture from the surface of the carcass.

Some lamb carcasses are shipped to the retailer without wrapping or protection of any kind. Others are placed in what is known as a lamb bag, that is, a plain, dry, loosely woven fabric bag which may or may not bear printing. The lamb bag has no function other than to prevent serious soiling of the carcass surface in transit from the packing house to the retailer. The lamb bag provides little protection for the lamb against the outer atmosphere with the result that whether or not it is used, the cool lamb carcass provides a focus for the condensation of moisture from the atmosphere whenever it is moved to an atmosphere of higher temperature which is necessitated in ordinary handling and shipping. This condensation of moisture on lamb carcasses tends to seriously deteriorate lamb and develop a sticky unpleasant surface.

Dressed lamb carcasses, unlike veal carcasses, for example, are covered with a thin membrane known as fel. The fel is a thin tough membrane which covers the surface of the carcass immediately below the pelt, and remains in place after removal of the pelt. It is difficult to remove and by reason of this difficulty and further for the reason that it provides a measure of protection it is not removed in the packing house. It is often removed from some cuts of lamb by the butcher. However, such cuts of lamb as the leg are normally roasted without removing the fel because the fel serves to assist in the retention of juices.

Lamb is a succulent, nourishing, desirable meat which is becoming of increasing importance as a source of food. Unfortunately, lamb is not consumed as freely as beef because of a peculiar woolly, oily flavor decidedly noticeable to many consumers.

We have found that the retention of the fel, which contains oil, is in large measure the source of the undesirable woolly flavor of lamb when cooked. It is not feasible to remove the fel in the packing house and in the case of some cuts because, as has been pointed out, it is undesirable to remove the fel before cooking. We have found that lamb may be greatly improved and the woolly flavor largely eliminated both in the case of lamb cooked with the fel in place and lamb cooked after removal of the fel.

The present invention involves a revolutionary departure in the dressing and marketing of lamb and provides a product of improved flavor, appearance and salability. Various methods have been proposed from time to time for clothing and otherwise wrapping fresh meat. Such expedients, however, have not been found of any avail in improving the flavor, appearance and salability of lamb carcasses or cuts thereof.

In the patent to Murphy, No. 1,506,599, it is proposed to treat a dressed beef carcass by stretching muslin which has been soaked in warm salt brine, as tightly as possible over the outside of the carcass, attaching it to the carcass by steel pins. The carcass is then transferred to a cooler and after about twenty-four hours the muslin is removed. The Murphy specification states that this treatment smoothes and bleaches the fat.

In our patent entitled Treatment of calves, No. 2,076,053, we described and claimed a new process for the treatment of calves.

The present invention is directed to lamb and affords a new departure in the handling of lamb carcasses and cuts thereof.

Attention is called to the drawings in which similar reference characters in the several figures indicate identical elements.

In carrying out the present invention, the lamb carcass 1, which is preferably suspended from a suspension means such as 2, is covered with a cloth 3 which has been soaked in a salt water solution. Cloth 3 is preferably prepared from beef sheeting. A satisfactory shroud may be prepared from a piece of muslin or beef sheeting of appropriate size, with a split cut down the center of one of the ends. Before application to the lamb carcass, the shroud is moistened with a preservative, preferably a sodium chloride water solution from 5° to 20° salometer reading strength. A satisfactory procedure is to soak the cloths in the brine and then wring the cloths in a centrifugal wringer resulting in a lightly brine moistened cloth. The cloth is then tightly and smoothly applied on the skinned surfaces of the carcass and fastened by such means as pins, sewed string stitches, or string ties and self binding tucks. In the latter instance, the self binding tucks may occur at the gambrel cords.

Figure 1:
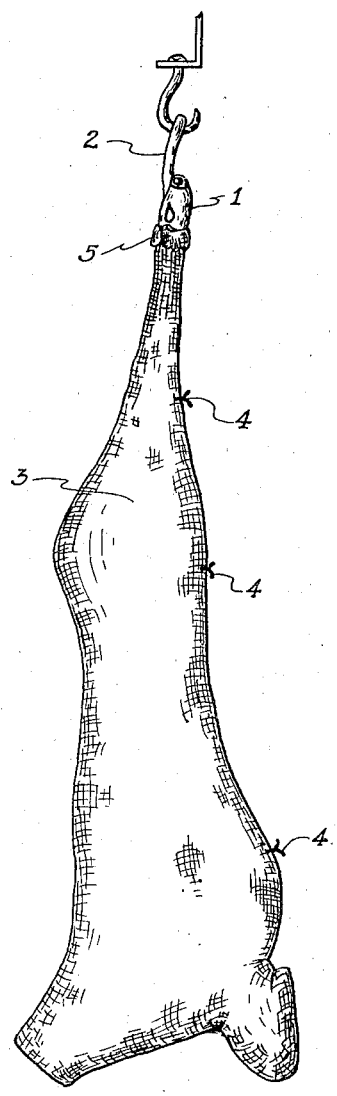
Figure 1 is a side view of a clothed lamb carcass in the course of the preparation of the package of the present invention.
Figure 2:
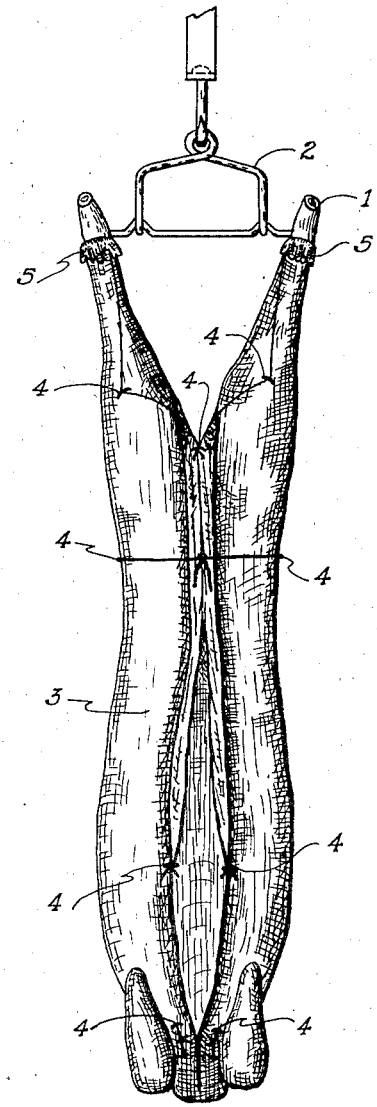
Figure 2 is a front view of the clothed carcass shown in Figure 1.

In the example shown in Figures 1 and 2, string ties such as 4 and self binding tucks such as 5 may be employed. It will be understood, of course, that any other means may be employed to clothe the lamb carcass with a smooth, close fitting shroud.

Figure 3:
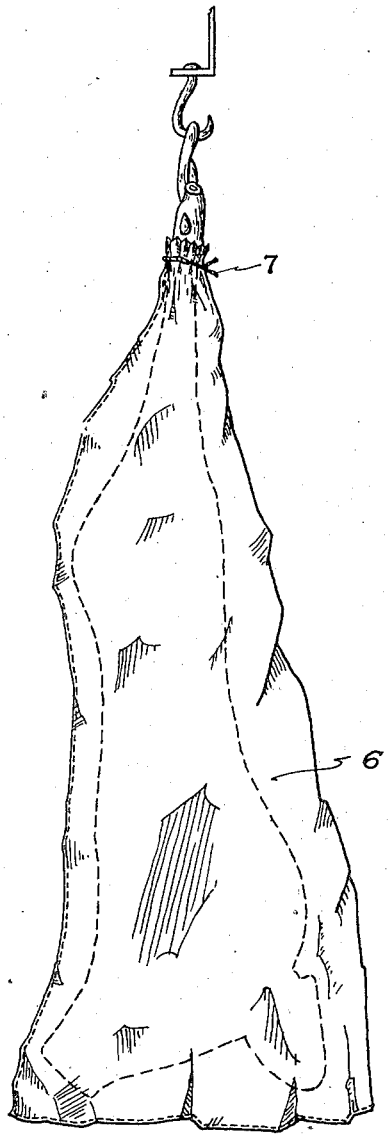
Figure 3 is a side view of a carcass such as is shown in Figure 1 which has been completely encased in a bag in accordance with the present invention.
Figure 4:
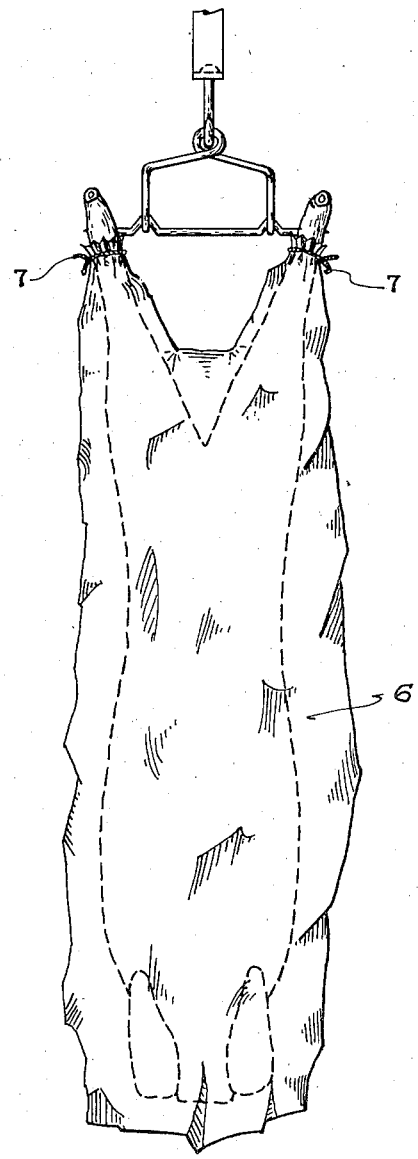
Figure 4 is a front view of the package shown in Figure 3.

After clothing, a paper bag, which may be a crinkled paper bag such as a kraft bag 6, closed on all sides and at one end, is pulled over the carcass and fastened in place by a string tie 7 at each of the knee joints of the hind legs, as shown in Figure 3 and Figure 4. If desired, the bag may be tied above the knee joints.

The brine moistened cloth is preferably applied to the warm carcass on or adjacent the killing floor after any desired brands or indicia have been applied. If desired, a preliminary salt shroud may be placed upon the carcass and after cooling a clean brine moistened cloth substituted before bagging.

Many tests of the effectiveness of the present invention have been made. It has been found that the lamb carcasses treated in accordance with the present invention may be held for protracted periods of time and shipped long distances with the handling necessarily incident thereto without surface deterioration, and after such holding, handling or shipping will be found to present a better appearance than lamb carcasses dressed and handled in the normal manner after a single night in the cooler. Furthermore, it is found that this treatment remarkably reduces the woolly or oily flavor which has been mentioned, rendering cuts of lamb from such carcasses suitable for cooking without removal of the fel. The presence of the outer wrapping which is substantially, but not entirely, impervious to the passage of air and moisture, exercises a humidor effect. The lightly brine moistened cloth in contact with the surface of the lamb serves to wick up sufficient moisture to maintain the cloth in moist condition and retain the sodium chloride in solution, the presence of which solution, we believe to be responsible for the improved flavor, although the cloth may dry out entirely before the meat reaches the consumer.

It will be understood, of course, that the present invention may be carried out by employing any desired means for producing a lamb carcass having a brine moistened absorbent covering in contact with the surface and an outer humidor wrapper.

We claim:

1. The method of substantially eliminating the woolly flavor of skinned lamb carcass meat having the fel retained thereon, which comprises clothing the skinned surface of the carcass with a brine moistened cloth and thereafter protecting the clothed carcass against evaporation.

2. The method of substantially eliminating the woolly flavor of skinned lamb carcasses having the fel retained thereon, which comprises applying a brine moistened cloth to the skinned surface of a lamb carcass, maintaining the brine moistened cloth smoothly in intimate contact with the skinned surface and thereafter enclosing the clothed carcass in a paper bag to protect the carcass against evaporation.

3. The method of substantially eliminating the woolly flavor of skinned lamb carcasses having the fel retained thereon, which comprises applying a brine moistened cloth to the skinned surface of a lamb carcass, maintaining the brine moistened cloth smoothly in intimate contact with the skinned surface and enclosing the clothed lamb carcass in an outer covering substantially impervious to air and moisture.

BEVERLY E. WILLIAMS.
LEON L. CADWELL.